(12) United States Patent
Liu et al.

(10) Patent No.: US 9,261,904 B2
(45) Date of Patent: Feb. 16, 2016

(54) POINT OF SALE SYSTEM

(71) Applicant: Top Victory Investments Limited, Kowloon (HK)

(72) Inventors: Chia-Yu Liu, New Taipei (TW); Yi-Sheng Lin, New Taipei (TW); Kuo-Chiang Chuang, New Taipei (TW)

(73) Assignee: Top Victory Investments Limited, Kowloon (HK)

( * ) Notice: Subject to any disclaimer, the term of this patent is extended or adjusted under 35 U.S.C. 154(b) by 267 days.

(21) Appl. No.: 14/028,262

(22) Filed: Sep. 16, 2013

(65) Prior Publication Data
US 2015/0077916 A1  Mar. 19, 2015

(51) Int. Cl.
*G06F 1/16* (2006.01)

(52) U.S. Cl.
CPC .................... *G06F 1/1613* (2013.01)

(58) Field of Classification Search
CPC ... G06F 1/1615; G06F 1/1633; G06F 1/1658; G06F 1/1679; G06F 1/1684
See application file for complete search history.

(56) References Cited

U.S. PATENT DOCUMENTS

| | | | | | |
|---|---|---|---|---|---|
| 5,781,405 | A | * | 7/1998 | Vossler | 361/523 |
| 5,825,617 | A | * | 10/1998 | Kochis et al. | 361/679.43 |
| 5,880,928 | A | * | 3/1999 | Ma | 361/679.27 |
| 6,003,008 | A | * | 12/1999 | Postrel et al. | 705/4 |
| 6,053,410 | A | * | 4/2000 | Wike et al. | 235/462.43 |
| 6,065,677 | A | * | 5/2000 | Lippert et al. | 235/462.43 |
| 6,193,152 | B1 | * | 2/2001 | Fernando et al. | 235/380 |
| 6,487,068 | B1 | * | 11/2002 | Rahemtulla | 361/679.04 |
| 6,587,151 | B1 | * | 7/2003 | Cipolla et al. | 348/373 |
| 6,812,958 | B1 | * | 11/2004 | Silvester | 348/207.1 |
| 6,853,545 | B2 | * | 2/2005 | Kosako et al. | 361/679.27 |
| 6,903,927 | B2 | * | 6/2005 | Anlauff | 361/679.28 |
| 7,563,040 | B2 | * | 7/2009 | Tsai et al. | 396/428 |
| 7,570,485 | B2 | * | 8/2009 | Krah | 361/679.23 |
| 7,748,620 | B2 | * | 7/2010 | Gomez et al. | 235/383 |
| 8,018,715 | B2 | * | 9/2011 | Chang | 361/679.04 |
| 8,520,377 | B2 | * | 8/2013 | Senatori | 361/679.27 |
| 8,550,343 | B2 | * | 10/2013 | Ko | 235/383 |
| 9,086,854 | B2 | * | 7/2015 | Liao et al. | |
| 2003/0169564 | A1 | * | 9/2003 | Masuda et al. | 361/681 |
| 2004/0068601 | A1 | * | 4/2004 | Kang et al. | 710/301 |
| 2005/0139660 | A1 | * | 6/2005 | Maxymych et al. | 235/383 |
| 2006/0056143 | A1 | * | 3/2006 | Tatsukami et al. | 361/683 |
| 2006/0061962 | A1 | * | 3/2006 | Oakley | 361/686 |
| 2010/0039763 | A1 | * | 2/2010 | Hsu et al. | 361/679.26 |
| 2013/0127737 | A1 | * | 5/2013 | Shneidman | 345/173 |
| 2014/0144988 | A1 | * | 5/2014 | Chiang | 235/449 |

* cited by examiner

*Primary Examiner* — Anthony Q Edwards
(74) *Attorney, Agent, or Firm* — The Mueller Law Office, P.C.

(57) ABSTRACT

A point of sale system includes a display device, a pivoting mechanism, a first electronic component and a base having a top surface. The display device includes a casing formed with a first receiving groove and a screen coupled to the casing and movable relative to the base between unfolded and folded positions. The pivoting mechanism interconnects pivotally the display device and the base. The first electronic component is connected to the casing and is movable between an inactive position where the first electronic component is retracted within the first receiving groove, and an active position where the first electronic component protrudes out of the first receiving groove.

12 Claims, 16 Drawing Sheets

POINT OF SALE SYSTEM

BACKGROUND OF THE INVENTION

1. Field of the Invention

The invention relates to a Point of Sale (POS) system, more particularly to a POS system with a collapsible display device.

2. Description of the Related Art

Conventional POS systems are generally bulky and heavy, and are difficult to be carried and moved around, so that they can only be used in commercial establishments or selling premises and installed at fixed locations, and are not suitable for transportation and being used in temporary spots, such as selling booths.

In addition, a conventional POS system is usually electrically connected to and cooperate with other external devices, such as barcode scanners, card readers, etc., to provide service. The overall space occupancy of the conventional POS system with the external devices is relatively large.

SUMMARY OF THE INVENTION

Therefore, the object of the present invention is to provide a Point of Sale (POS) system that can eliminate the aforesaid drawbacks of the prior art.

According to the present invention, there is provided a point of sale system including a display device, a pivoting mechanism, and a first electronic component and a base that has a top surface.

The display device includes a casing that is formed with a first receiving groove, and a screen that is coupled to the casing, and that is movable relative to the base between an unfolded position and a folded position. The unfolded position is where the top surface of the base and the screen cooperatively define an angle therebetween and the folded position is where the top surface of the base contacts the screen. The pivoting mechanism interconnects pivotally the display device and the base. The first electronic component is connected to the casing and is movable between an inactive position where the first electronic component is retracted within the first receiving groove, and an active position where the first electronic component protrudes out of the first receiving groove.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
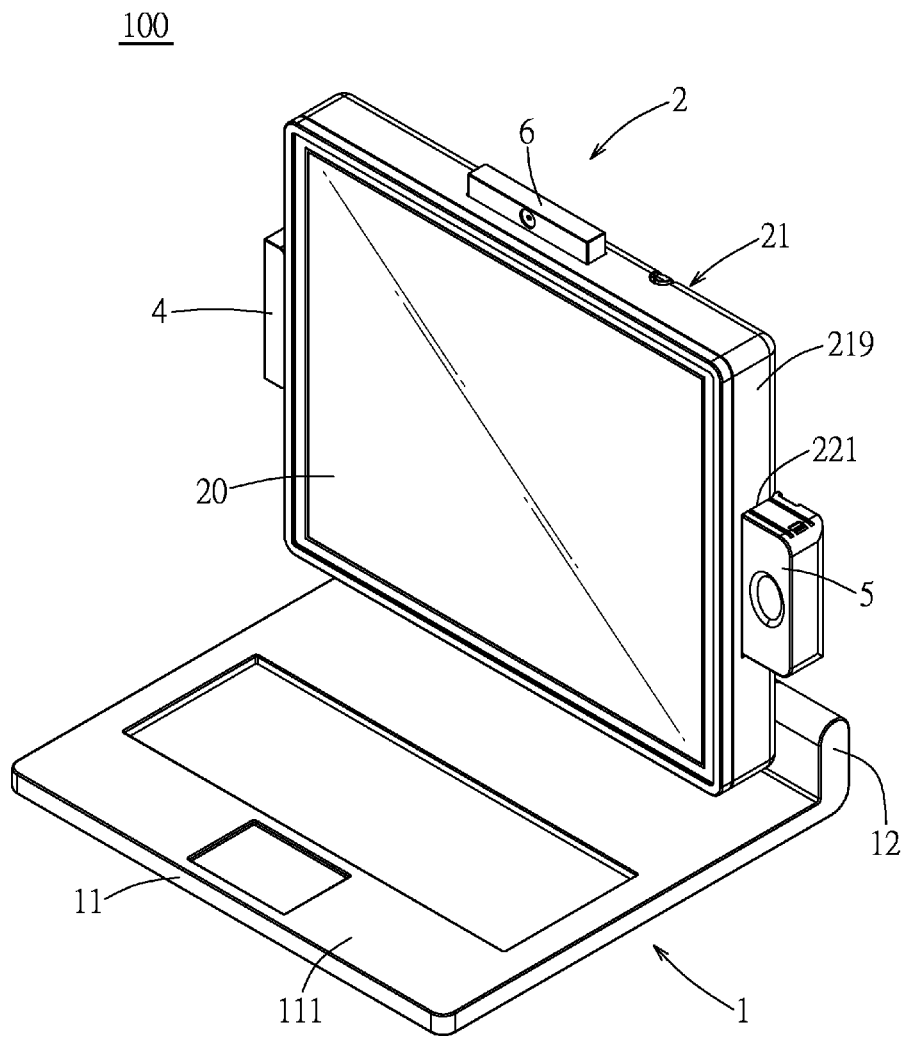
FIG. 1 is a perspective view of the preferred embodiment of a Point of Sale system according to the present invention, illustrating a display device at an unfolded position.
Figure 2:
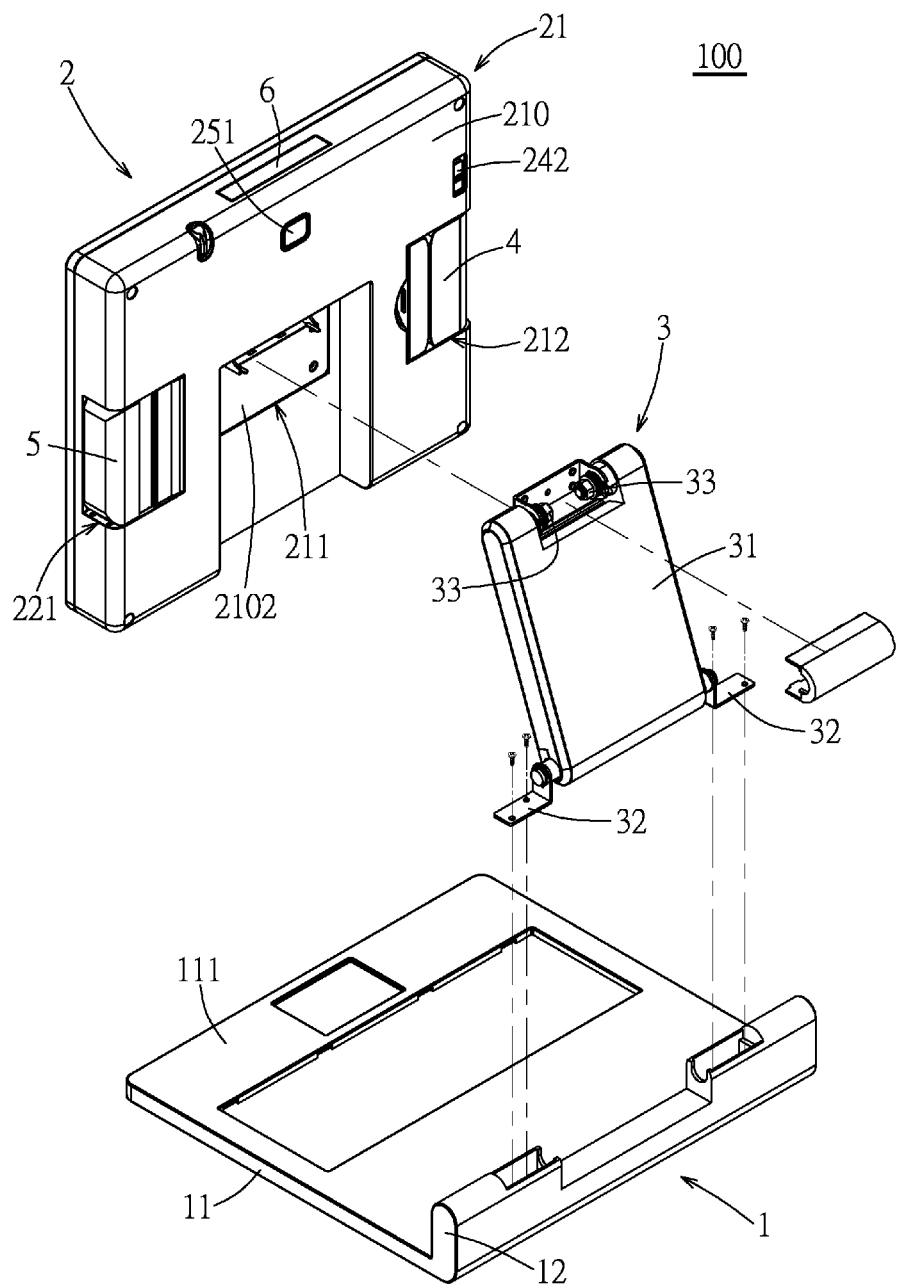
FIG. 2 is an exploded perspective view of the preferred embodiment.

Referring to FIGS. 1 and 2, a Point of Sale (POS) system according to the preferred embodiment of the present invention includes a base 1, a display device 2, a pivoting mechanism 3, a first electronic component 4, a second electronic component 5, and a third electronic component 6.

Figure 3:
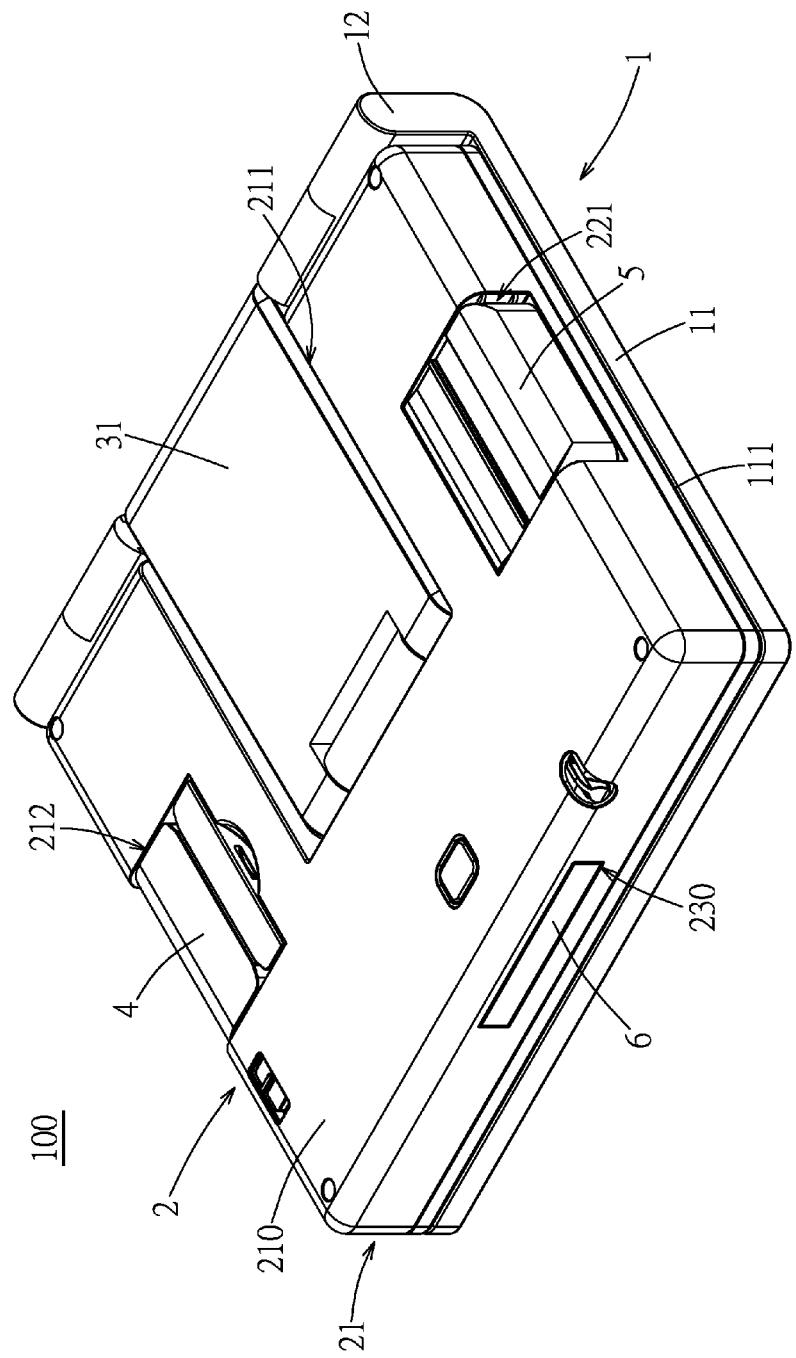
FIG. 3 is another perspective view of the preferred embodiment, illustrating the display device at a folded position.

Referring further to FIG. 3, the base 1 has a flat first base body 11 having a top surface 111, and a second base body 12 projecting upwardly from a rear end of the top surface 111 of the first base body 11.

The display device 2 includes a casing 21 and a screen 20 that is coupled to the casing 21. In this embodiment, the screen 20 is a touch screen and is not limited to what is disclosed herein.

The pivoting mechanism 3 interconnects pivotally the display device 2 and the base 1, so that the display device 2 is movable relative to the base 1 between an unfolded position (see FIG. 1), where the top surface 111 of the base 1 and the screen 20 cooperatively define an angle therebetween, and a folded position (see FIG. 3), where the top surface 111 of the base 1 contacts the screen 20. It is to be understood that, in the following description, the directional relationship among the elements of the POS system of this invention is defined under the situation that the display device 2 is at the unfolded position with the angle being 90 degrees.

Figure 4:
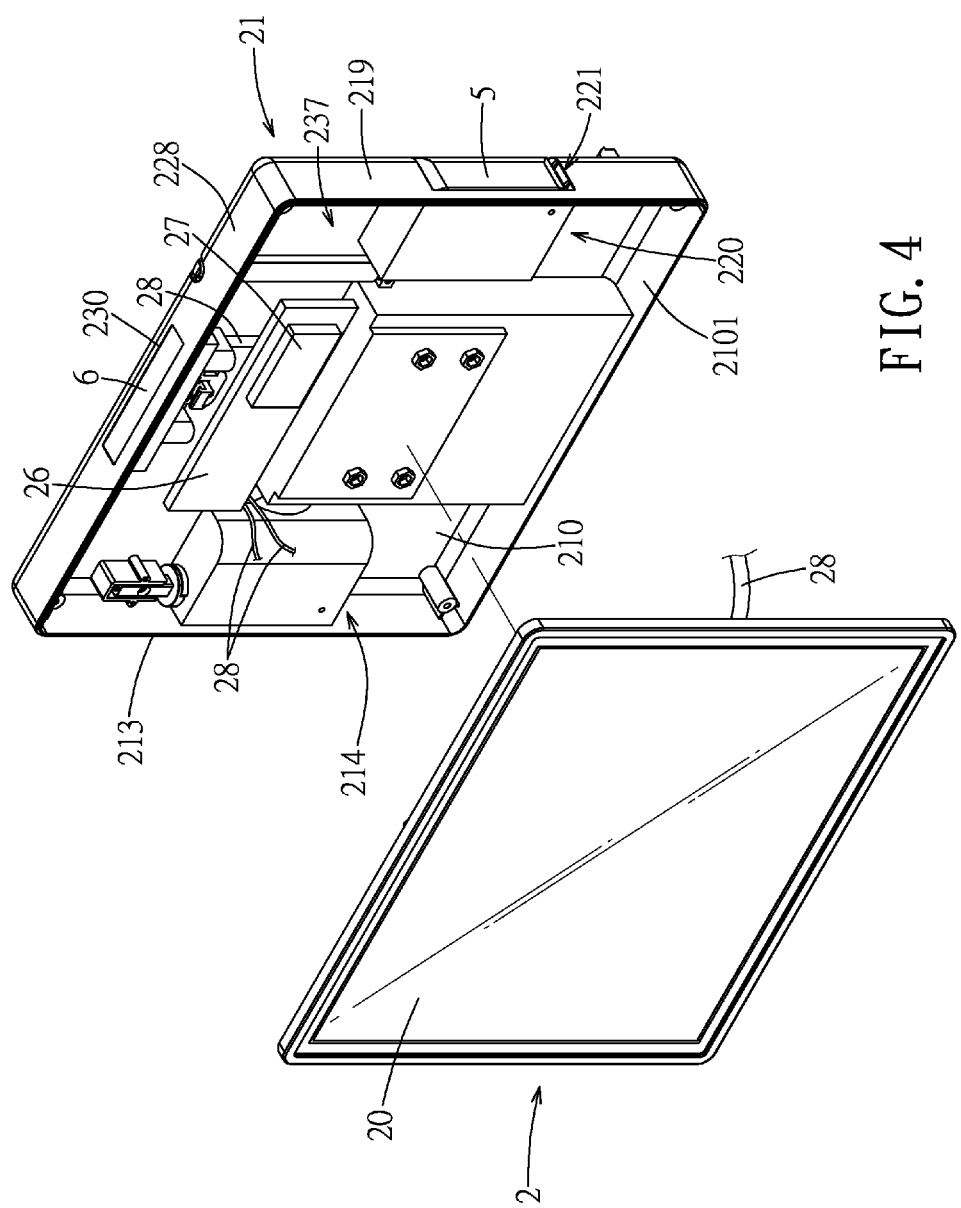
FIG. 4 is an exploded perspective view of the display device of the preferred embodiment.

With further reference to FIG. 4, the casing 21 of the display device 2 includes a back board 210, a bottom board 2101 connected to a bottom end of the back board 210. The backboard 210 is formed with an accommodating groove 211 adjacent to the bottom board 2101. The pivot mechanism 3 includes a support arm 31, two first hinges 32 interconnecting the support arm 31 and the base 1, and two second hinges 33 interconnecting the support arm 31 and the back board 210. In this embodiment, the first hinges 32 are fixed to the second base body 12 through screws, thereby allowing the second base body 12 to pivot relative to the support arm 31, and the second hinges 33 are also fixed to the casing 21 through screws, thus allowing the display device 2 to move relative to the support arm 31. As such, when the display device 2 is at the unfolded position, an angle between the display device 2 and the support arm. 31 can be adjusted. When the display device 2 is at the folded position, the support arm 31 is retracted in the accommodating groove 211 with a back surface of the support arm 31 being flush with the back board 210, so that the POS system of this invention is effectively compact and is easy to be transported. It should be noted that the number of the first and second hinges 32, 33 may vary in other embodiments of this invention.

Figure 5:
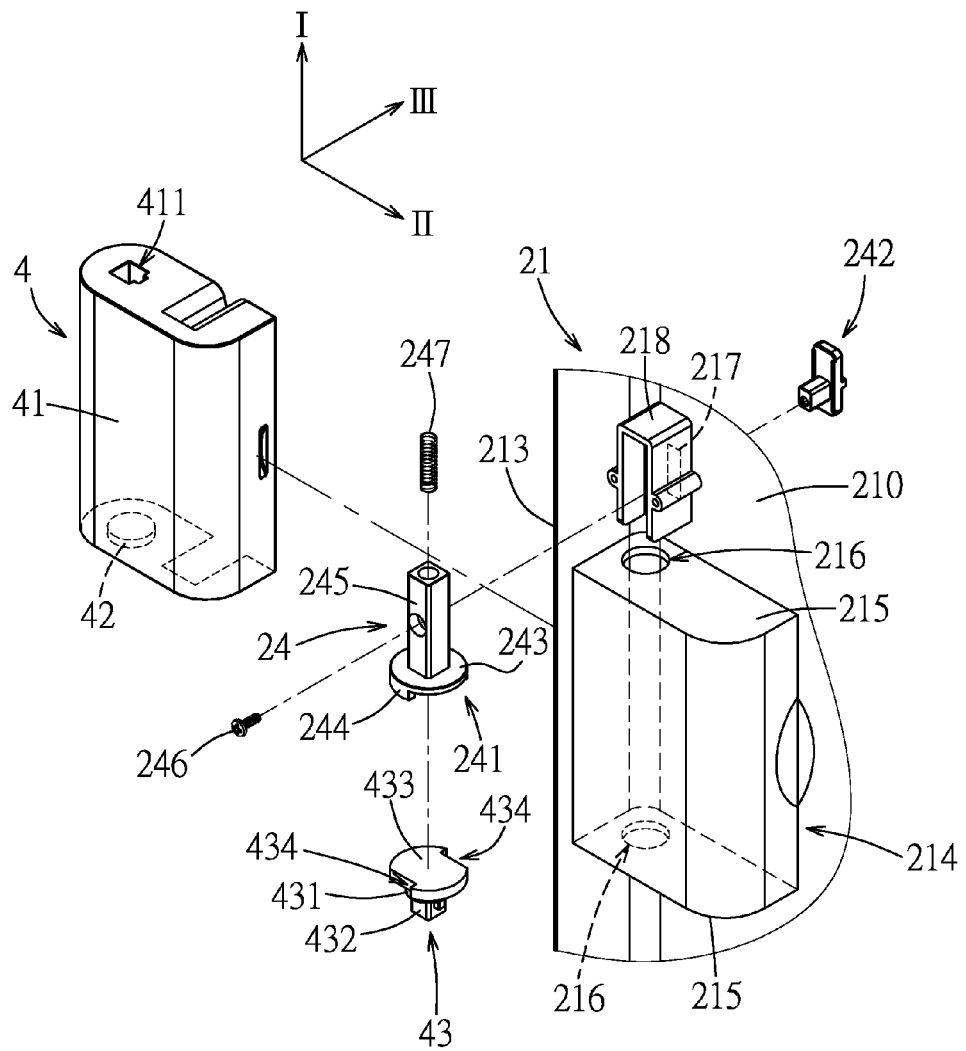
FIG. 5 is a fragmentary exploded perspective view of a casing, a first electronic component and a first locking mechanism of the preferred embodiment.
Figure 9:
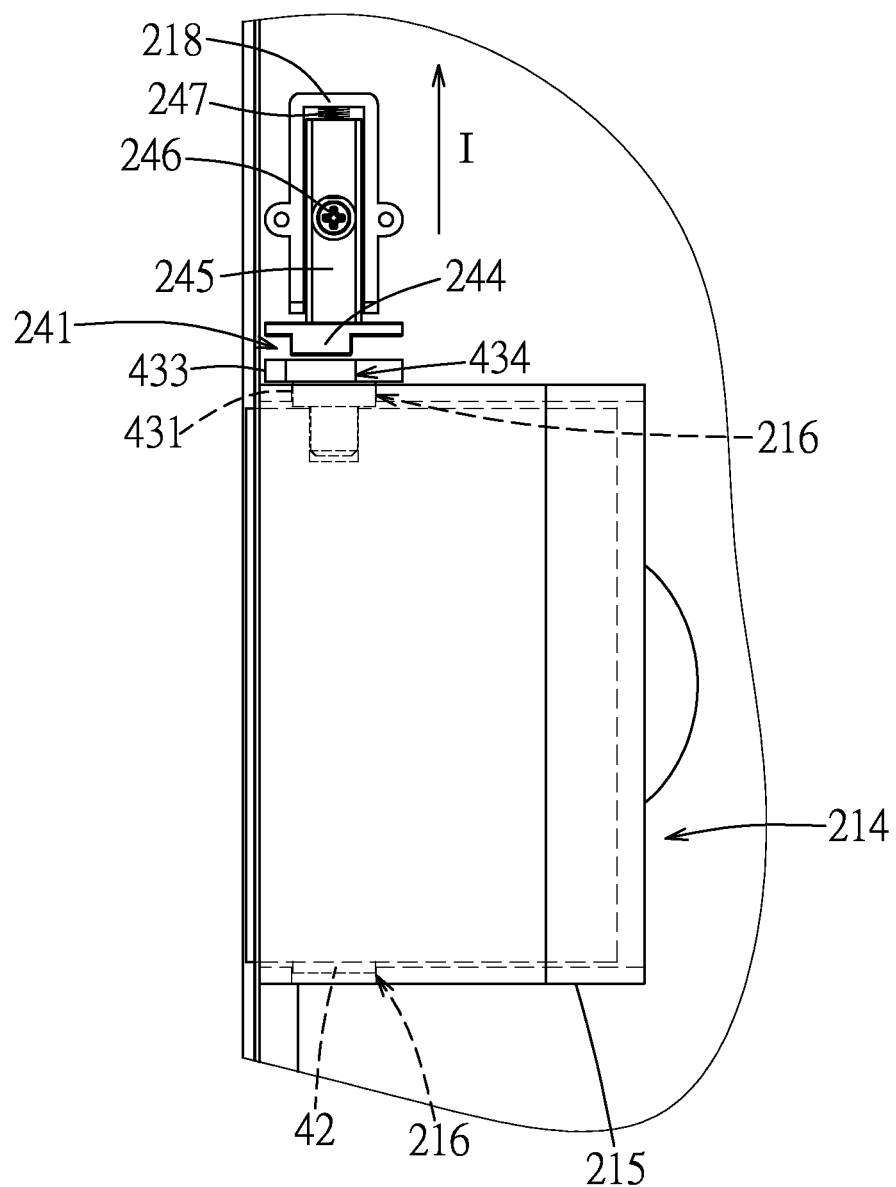
FIG. 9 is a view similar to FIG. 6, but illustrating the first electronic component at the inactive position and the first locking mechanism at an unlocked state.
Figure 10:
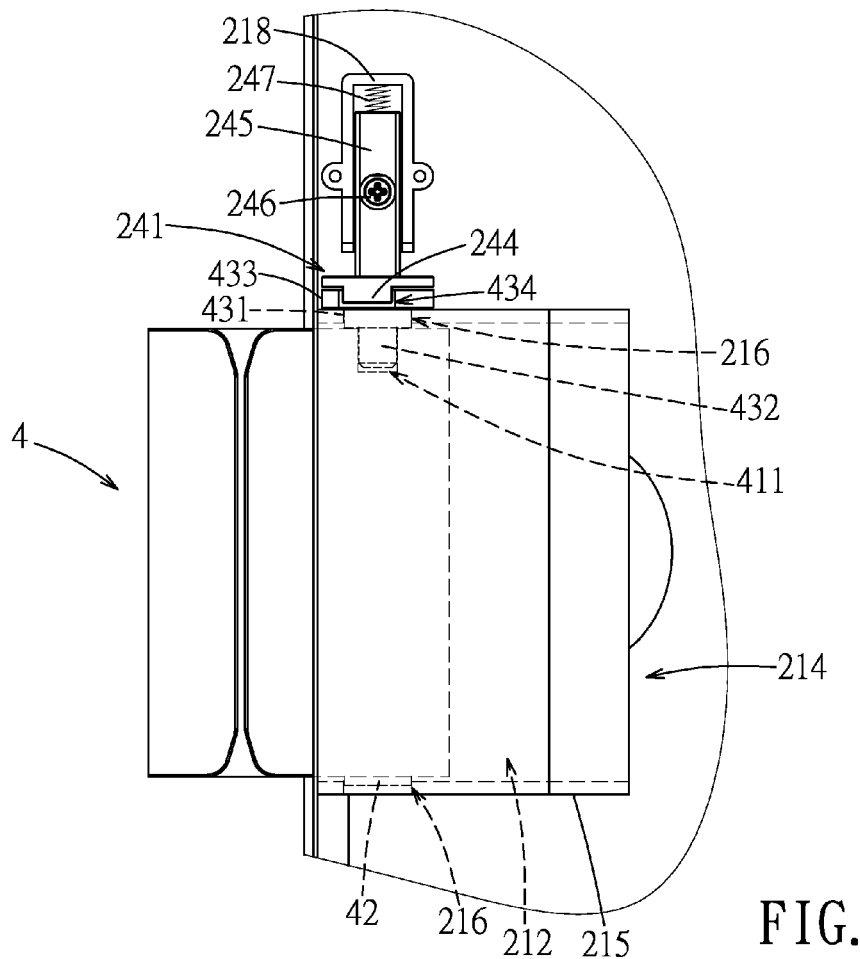
FIG. 10 is a view similar to FIG. 6, but illustrating the first electronic component at an active position and the first locking mechanism in the locked state.
Figure 11:
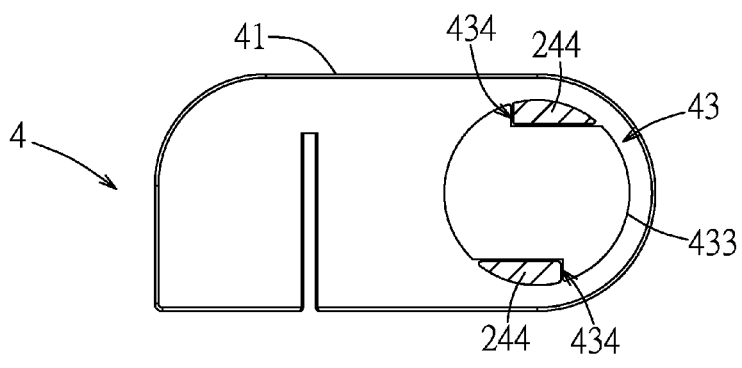
FIG. 11 is a view similar to FIG. 7, but illustrating the first electronic component at the active position and the first locking mechanism in the locked state.

As shown in FIGS. 2, 4 and 5, the casing 21 of the display device 2 further includes a first lateral board 213 connected to the back board 210, and a first carrier 214 interconnecting the back board 210 and the first lateral board 213 and defining a first receiving groove 212. In this embodiment, the first electronic component 4 is a card reader that is connected to the casing 21 and that is movable between an inactive position (see FIGS. 6, 8 and 9), where the first electronic component 4 is retracted within the first receiving groove 212, and an active position (see FIG. 10), where the first electronic component 4 protrudes out of the first receiving groove 212.

The first carrier 214 includes two pivoting plates 215 that are opposite to each other along a vertical axis (I). Each of the pivoting plates 215 is formed with a through hole 216. The first electronic component 4 includes an outer case 41 having an end that is formed with a pivoting column 42 engaging pivotally the through hole 216 in one of the pivoting plates 215, and an opposite end along the vertical axis (I) that is formed with a non-circular hole 411. The first electronic component 4 further includes a pivot 43 having a pivoting portion 431 that engages pivotally the through hole 216 in the other one of the pivoting plates 215, an insert portion 432 that is connected to an end of the pivoting portion 431 and that is inserted fittingly and co-rotatably into the non-circular hole 411, and an engaging portion 433 that is connected to an opposite end of the pivoting portion 431 and that has an outer diameter greater than both the outer diameter of the pivoting portion 431 and a diameter of the through hole 216 in the other one of the pivoting plates 215. In this embodiment, the engaging portion 433 is round and is formed with diametrically-opposite first and second engaging recesses 434 (see FIG. 7). The configuration of the pivot 43 can prevent separation of the first electronic component 4 from the first receiving groove 212 during pivot movement of the first electronic component 4.

Figure 6:
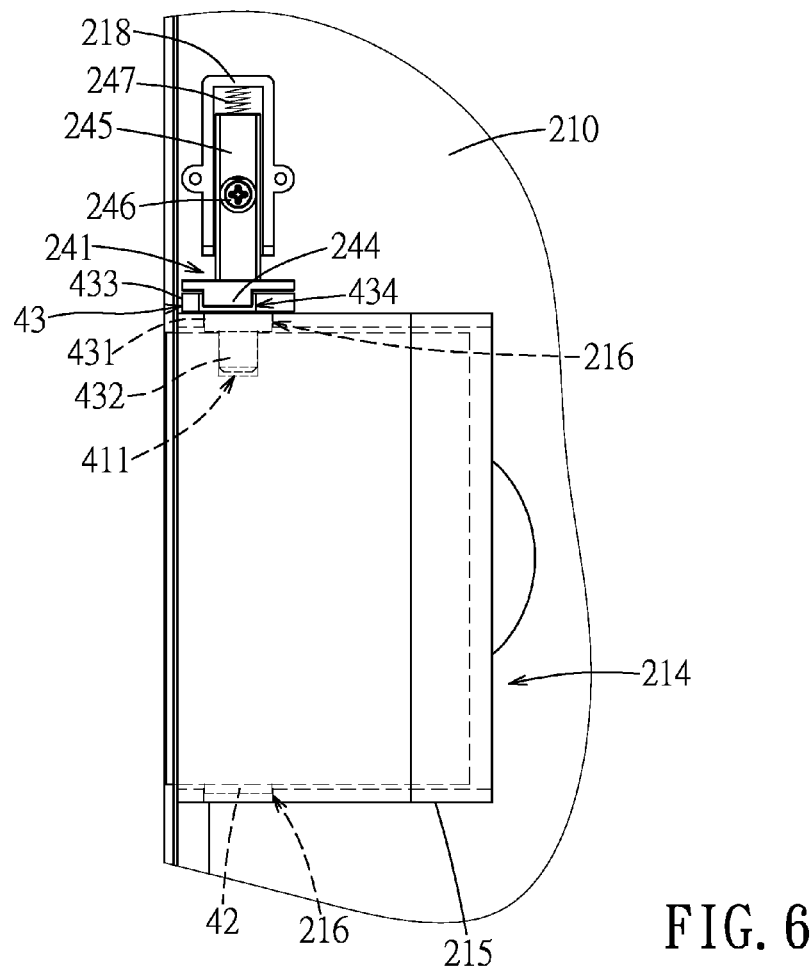
FIG. 6 is a fragmentary assembled view of the casing, the first electronic component and the first locking mechanism of the preferred embodiment, illustrating the first electronic component at an inactive position and the first locking mechanism in a locked state.
Figure 7:
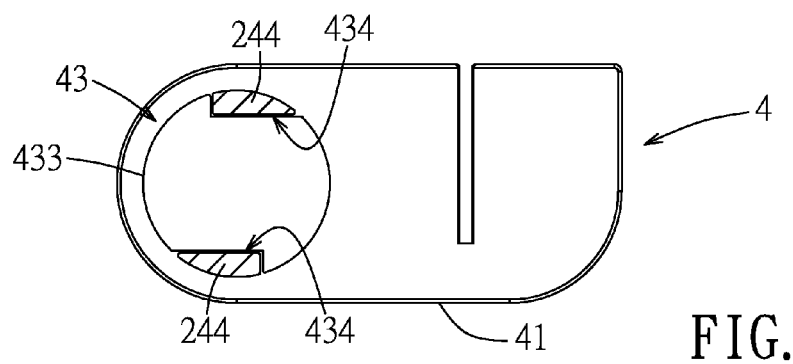
FIG. 7 is a sectional view of the first electronic component and the first locking mechanism of the preferred embodiment, illustrating the first electronic component at the inactive position and the first locking mechanism in the locked state.

As further shown in FIGS. 6 and 7, the display device 2 further includes a first locking mechanism 24. The first locking mechanism 24 includes an engaging member 241 and a lock-and-release button 242. The engaging member 241 includes a disk portion 243 formed with first and second engaging protrusions 244, and a shaft portion 245 extending upwardly from the disk portion 243. The engaging member 241 is movable relative to the first carrier 214 along the vertical axis (I) between a locked position (see FIGS. 6, 7, 10 and 11), where the first and second engaging protrusions 244 engage to the first and second engaging recesses 434, and an unlocked position (see FIG. 9), where the first and second engaging protrusions 244 (only one is shown) are disengaged from the first and second engaging recesses 434. It is noted that, only one engaging protrusion 244 and one engaging recess 434 may be employed in other embodiments of this invention.

The back board 10 is further formed with a slot 217. The casing 21 further includes an inverted U-shaped limit element 218 connected to an inner surface of the back board 210 and disposed over the slot 217. The lock-and-release button 242 is disposed at an outer side of the back board 210 and has a projecting segment extending movably into the slot 217. The first locking mechanism 24 further includes a screw 246 extending through the shaft portion 245 of the engaging member 241, the slot 217 and the projecting segment of the lock-and-release button 242 so that the lock-and-release button 242 is co-movable with the engaging member 241, and a first spring 247 having opposite ends that abut respectively against the limit element 218 and a top end of the shaft portion 245 of the engaging member 241 for biasing the engaging member 241 toward the locked position.

Figure 8:
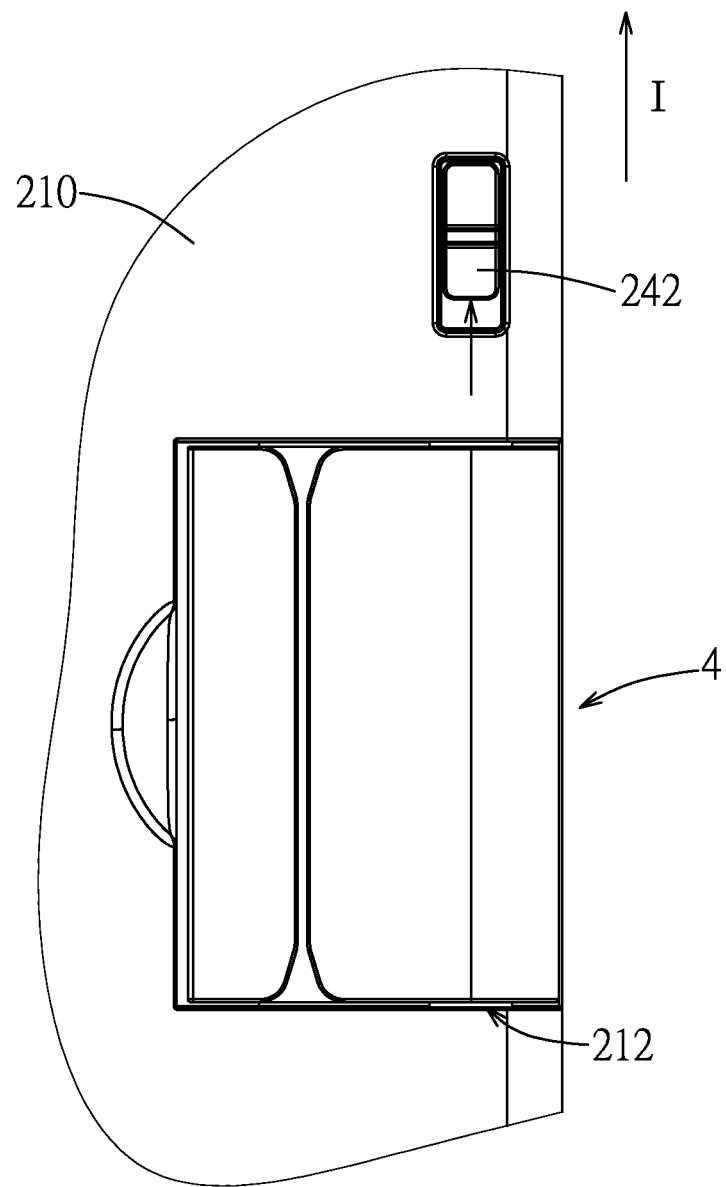
FIG. 8 is a fragmentary rear view of the display device of the preferred embodiment, illustrating the first electronic component at the inactive position.

When the first electronic component 4 is at the inactive position, the engaging member 241 is at the locking position with the first and second engaging protrusions 244 engaging respectively to the first and second engaging recesses 434 (see FIG. 7) so that the first electronic component 4 is not permitted to move relative to the first carrier 214. As shown in FIG. 8, the lock-and-release button 242 can then be pushed upwardly to drive upward movement of the engaging member 241 from the locked position to the unlocked position against the resilient force of the first spring 247, so that the first and second engaging protrusions 244 are disengaged respectively from the first and second engaging recesses 434 (see FIG. 9), thereby permitting the first electronic component 4 to pivot from the inactive position to the active position (see FIG. 10) by 180 degrees. When the lock-and-release button 242 is released, the engaging member 241 is biased by the restoring force of the first spring 247 back to the locked position with the first and second engaging protrusions 244 engaging respectively to the second and first engaging recesses 434 (see FIG. 10) since the pivot 43 has been rotated together with the first electronic component 4 during the abovementioned pivot action.

Figure 12:
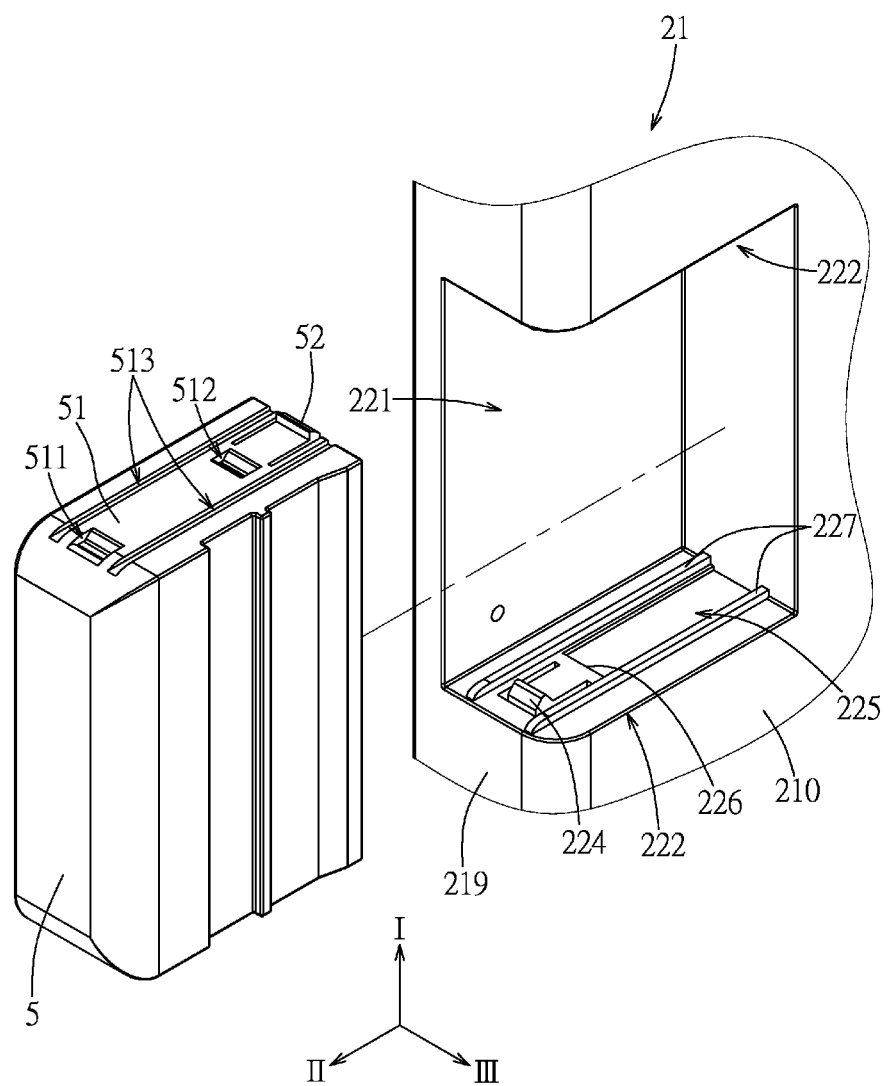
FIG. 12 a fragmentary exploded perspective view of the casing and a second electronic component of the preferred embodiment.
Figure 13:
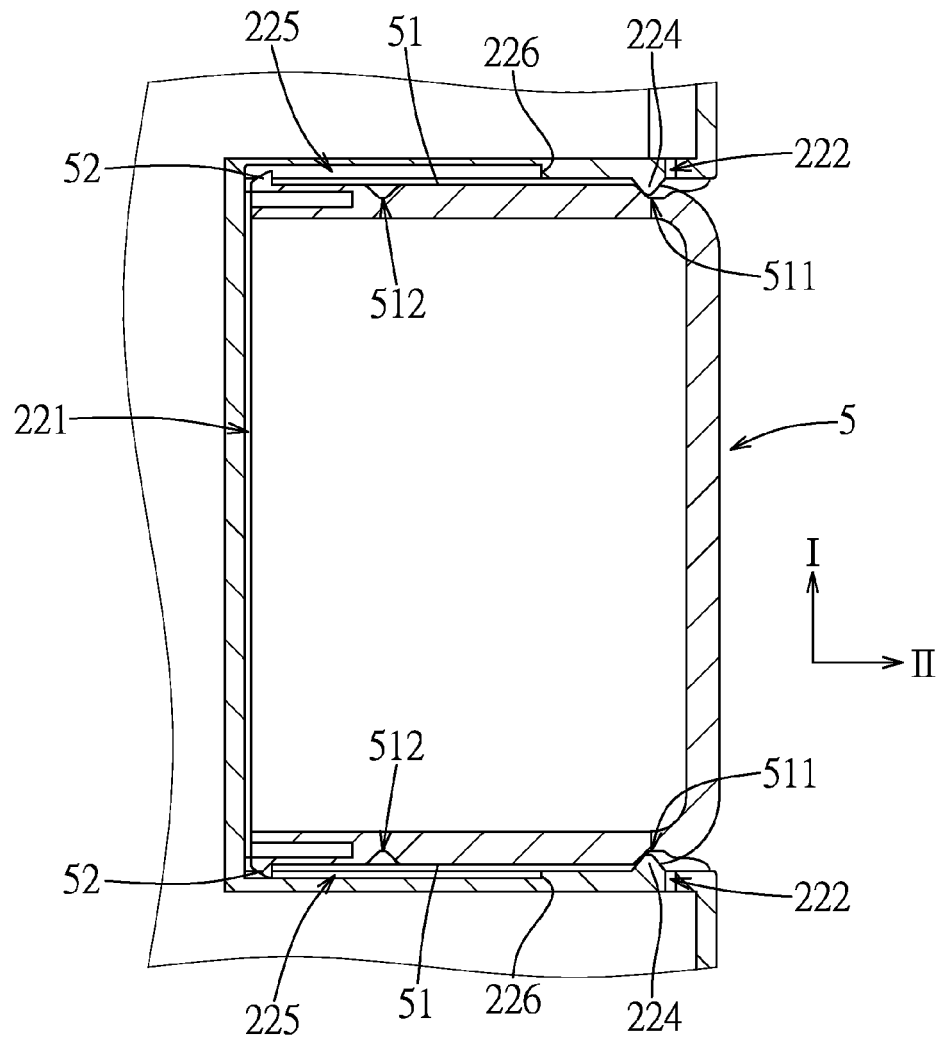
FIG. 13 is a fragmentary assembled sectional view of the casing and the second electronic component of the preferred embodiment, illustrating the second electronic component at an inactive position.
Figure 14:
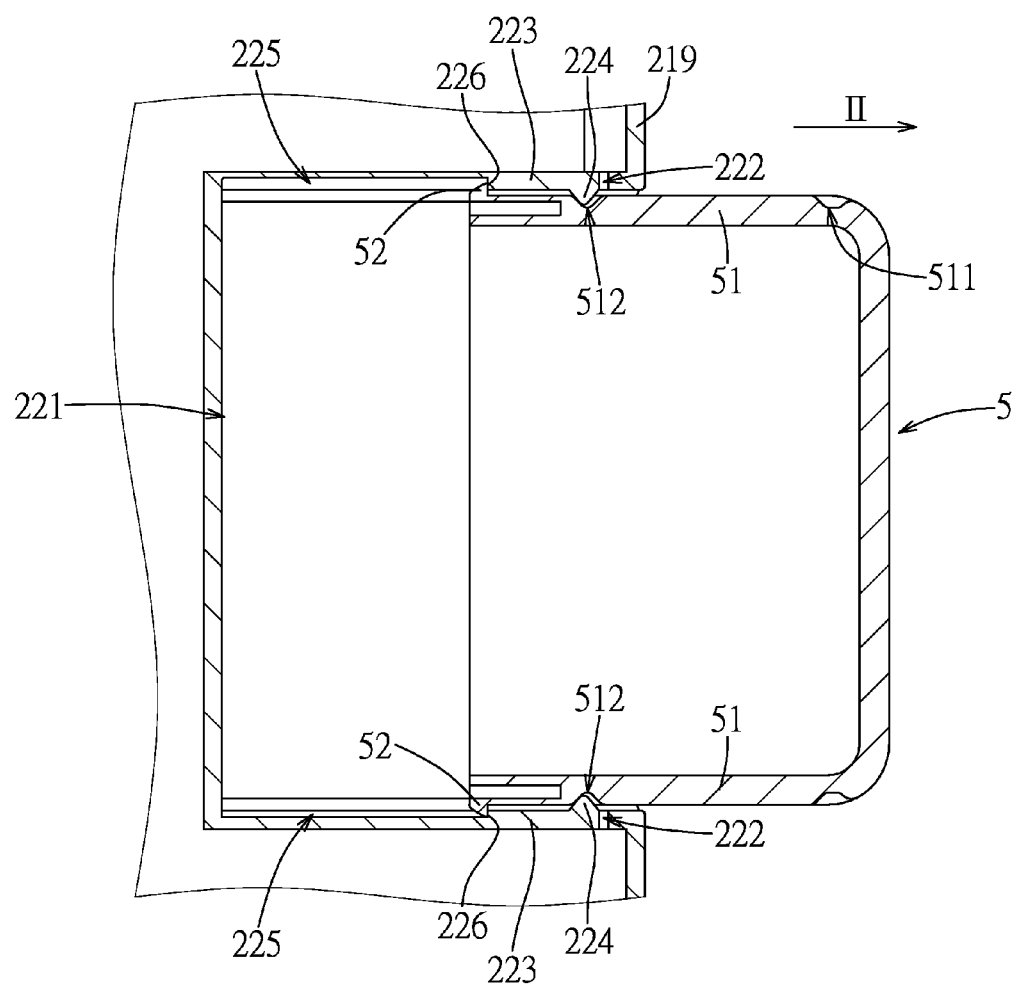
FIG. 14 is a view similar to FIG. 13, but illustrating the second electronic component at an active position.

Referring back to FIG. 4, and further referring to FIGS. 12 to 14, the casing 21 further includes a second lateral board 219 that is connected to the back board 210 and that is opposite to the first lateral board 213 in a left-right axis (II), and a second carrier 220 that interconnects the backboard 210 and the second lateral board 219 and that defines a second receiving groove 221. In this embodiment, the second electronic component 5 is a fingerprint identification device that is disposed in the second receiving groove 221 and that is movable between an inactive position (see FIG. 13), where the second electronic component 5 is retracted within the second receiving groove 221, and an active position (see FIG. 14), where the second electronic component 5 protrudes out of the second receiving groove 221.

In this embodiment, the second electronic component 5 has top and bottom surfaces 51, each of which is formed with first and second positioning grooves 511, 512 spaced apart from each other along the left-right axis (II). The second carrier 220 includes two connecting plates 222 opposite to each other along the vertical axis (I). Each of the connecting plates 222 includes a positioning hook 224 that is proximate to the second lateral board 219. When the second electronic component 5 is at the inactive position, the positioning hooks 224 of the connecting plates 222 engage respectively the first positioning grooves 511 of the first electronic component 5. When the second electronic component 5 is pulled from the inactive position to the active position, the positioning hooks 224 of the connecting plates 222 resiliently deform and are disengaged respectively from the first positioning grooves 511 and then engage resiliently and respectively the second positioning grooves 512 for positioning the second electronic component 5 at the active position relative to the second carrier 220.

Preferably, in this embodiment, each of the connecting plates 222 has an elongated groove 225 that extends along the left-right axis (II), and a shoulder portion 226 that is formed at an end of the elongated groove 225 proximate to the positioning hook 224 of the connecting plates 222. The second electronic component 5 further has two limiting members 52 that project respectively from the top and bottom surfaces 51, that are slidable respectively along the elongated grooves 225 of the connecting plates 222, and that abut respectively against the shoulder portions 226 of the connecting plates 222 when the second electronic component 5 is at the active position for preventing the second electronic component 5 from falling out of the second receiving groove 221. Each of the top and bottom surfaces 51 of the second electronic component 5 is formed with two guiding grooves 513 that extend along the left-right axis (II) and that are spaced apart from each other in a front-rear axis (III). Each of the connecting plates 222 further has two guiding rails 227 extending along the left-right axis (II) and engaging slidably and respectively the guiding grooves 513 of a respective one of the top and bottom surfaces 51, so as to ensure smooth movement of the second electronic component 5 between the inactive and active positions. It is noted that, only one positioning hook 224, one elongated groove 225, one shoulder portion 226, one guiding rail 227, one first positioning groove 511, one second positioning groove 512, one guiding groove 513 and one limiting member 52 may be employed in other embodiments of this invention.

Figure 15:
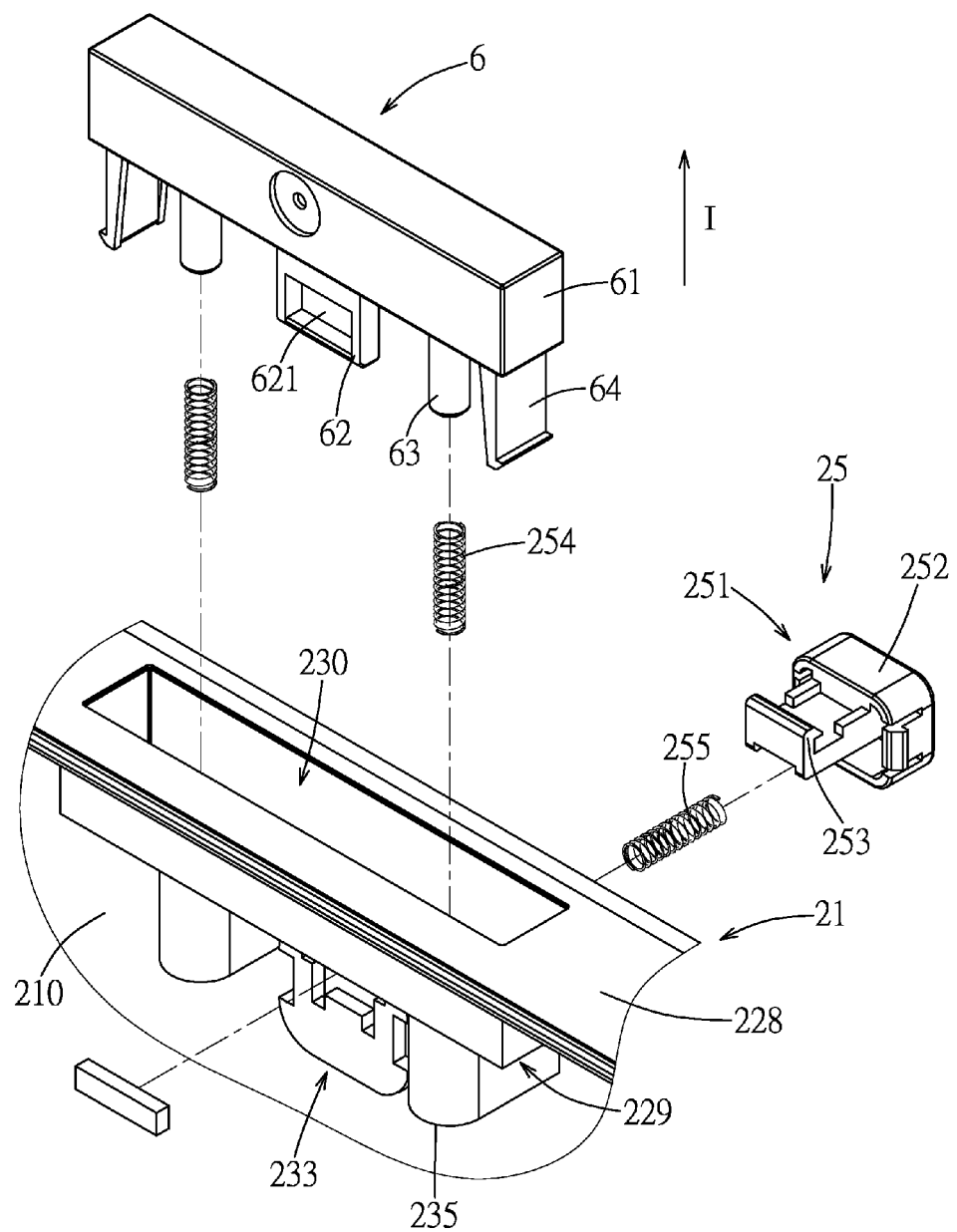
FIG. 15 is a fragmentary exploded perspective view of the casing, a third electronic component, and a second locking mechanism of the preferred embodiment.
Figure 16:
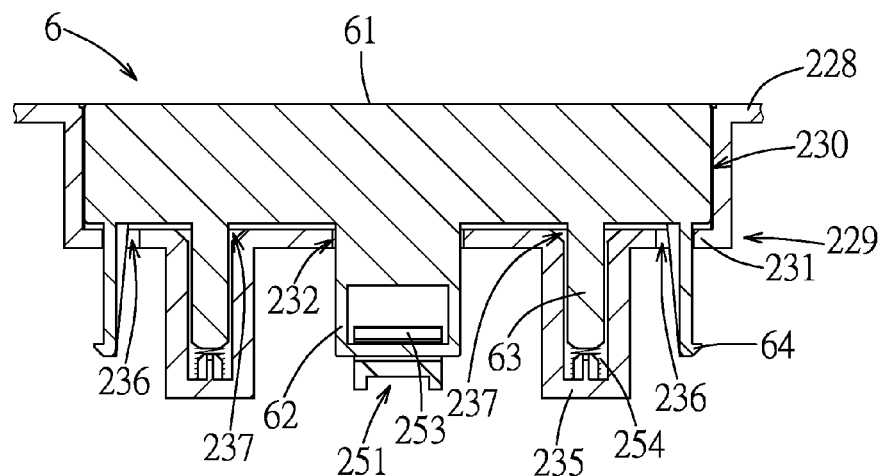
FIG. 16 is a fragmentary sectional view of the casing, the third electronic component, and the second locking mechanism of the preferred embodiment, illustrating the third electronic component at an inactive position.
Figure 17:
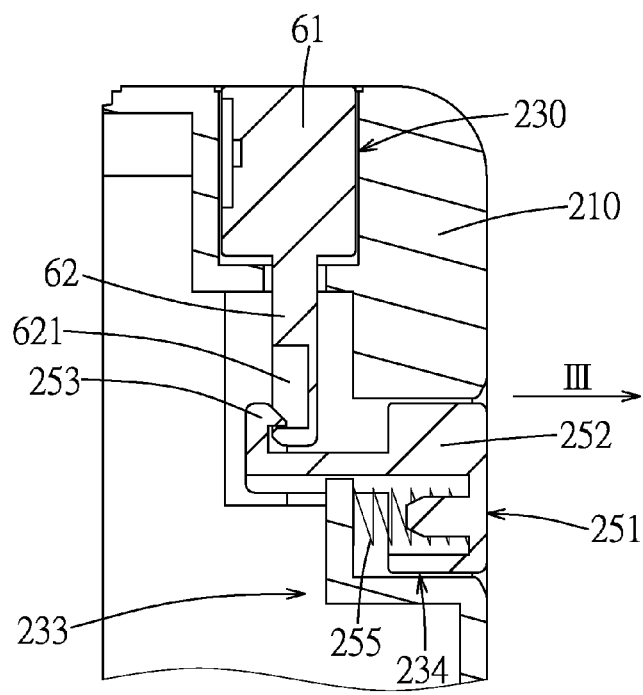
FIG. 17 is another fragmentary sectional view of the casing, the third electronic component, and the second locking mechanism of the preferred embodiment, illustrating the third electronic component at the inactive position and the third locking mechanism in a locked state.

Referring back to FIG. 4, and further referring to FIGS. 15 to 17, the casing 21 further includes a top board 228 that interconnects the back board 210 and the first and second lateral boards 213, 219, and a third carrier 229 that is connected to the top board 228 and that defines a third receiving groove 230. In this embodiment, the third electronic component 6 is a camera disposed in the third receiving groove 230 and slidable along the vertical axis (I) between an inactive position (see FIGS. 16 and 17), where the third electronic component 6 is retracted within the third receiving groove 230, and an active position (see FIG. 19), where the third electronic component 6 protrudes out of the third receiving groove 230.

In this embodiment, the third electronic component 6 has an outer case 61, a projecting plate 62 that projects downwardly, and two stop hooks 64 that are disposed respectively at left and right sides of the projecting plate 62 and that project downwardly. The projecting plate 62 has a cavity 621. The third carrier 229 has a carrier board 231 for supporting the third electronic component 6 thereon when the third electronic component 6 is at the inactive position. The carrier board 231 has a first hole 232 for extension of the projecting plate 62 therethrough, and two second holes 236 formed respectively at left and right sides of the first hole 232. The stop hooks 64 extend respectively through the second holes 236. The carrier board 231 further has two third holes 237, each of which is formed between the first hole 232 and a respective one of the second holes 236. The third carrier 229 further has two barrel walls 235 extending downwardly from the carrier board 231. Each of the barrel walls 235 defines a spring-receiving space in spatial communication with a respective one of the third holes 237. The third electronic component 6 further has two protruding columns 63, each of which extends movably into the spring-receiving space of a respective one of the barrel walls 235.

The casing 21 further includes a fourth carrier 233 below the third carrier 229 and defining a fourth receiving groove 234. The display device 2 further includes a second locking mechanism 25 that includes a lock button 251 movable in the fourth receiving groove 234 along the front-rear axis (III) between a locked position (see FIG. 17), where the lock button 251 engages the cavity 621 of the projecting plate 62, and a released position (see FIG. 18), where the lock button 251 is disengaged from the cavity 621. The lock button 251 has an exposed press portion 252 and a hook portion 253 connected to the press portion 252 and engaging the cavity 621 when the lock button 251 is at the locked position. The second locking mechanism 25 further includes two second springs 254 and a third spring 255. Each of the second springs 254 is disposed in the spring-receiving space of the respective one of the barrel walls 235, and has opposite ends abutting respectively and resiliently against a respective one the protruding columns 63 and the respective one of the barrel walls 235 for biasing the third electronic component 6 toward the active position. The third spring 255 has opposite ends abutting respectively and resiliently against the fourth carrier 233 and the press portion 252 of the locking button 251 for biasing the lock button 251 rearwardly toward the locked position.

Figure 18:
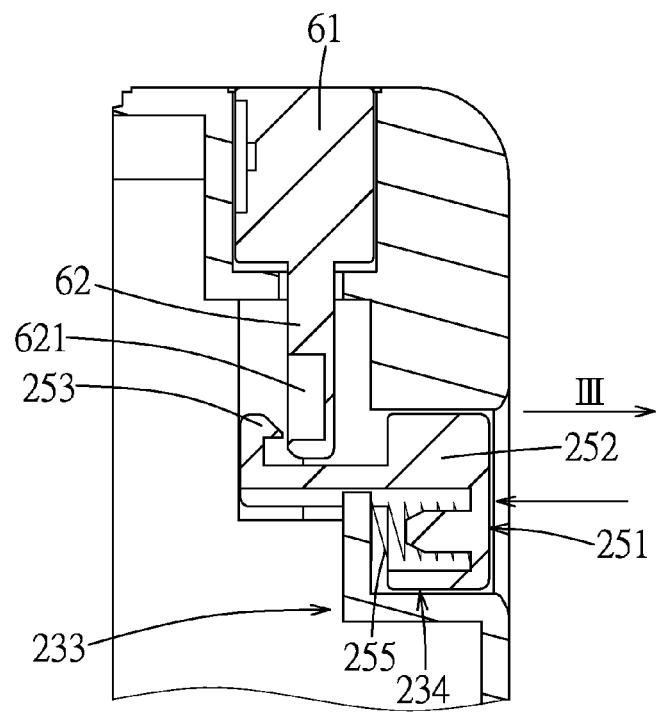
FIG. 18 is a view similar to FIG. 17, but illustrating the third locking mechanism in an unlocked state.
Figure 19:
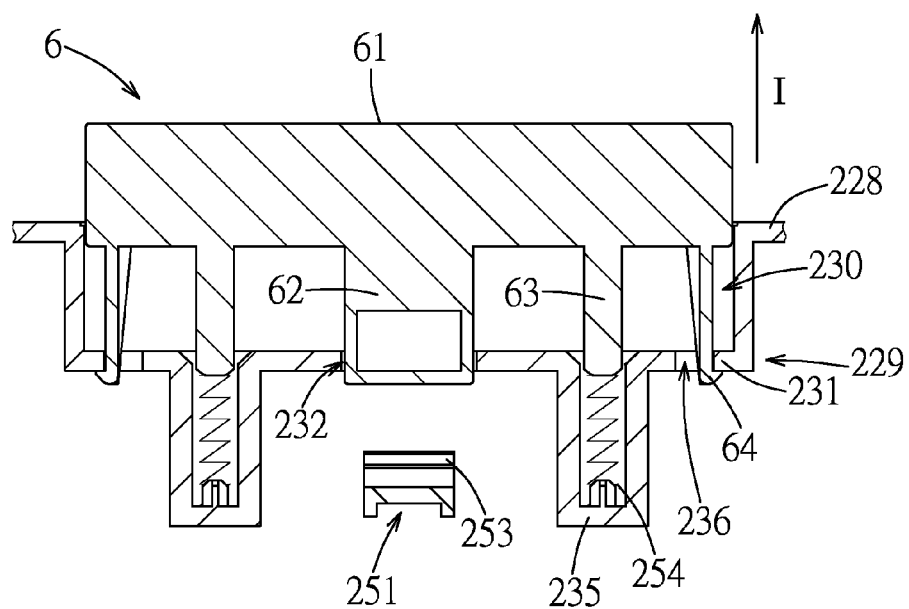
FIG. 19 is a view similar to FIG. 16, but illustrating the third electronic component at an active position.

When the third electronic component 6 is at the inactive position (see FIGS. 16 and 17), a user can press the press portion 252 of the locking button 251 to move along the front-rear axis (III) against the resilient force of the third spring 255, so that the hook portion 253 is disengaged from the cavity 621, and that the third electronic component 6 is biased upwardly by the second springs 254 to the active position (see FIGS. 18 and 19). At this time, the stop hooks 64 abut against the carrier board 231 for preventing separation of the third electronic component 6 from the third receiving groove 230. In this embodiment, the hook portion 253 of the locking button 251 has an inclined surface 256 (see FIG. 20). When the user releases the locking button 251, the locking button 251 is moved by the restoring force of the third spring 255 to the locked position.

Figure 20:
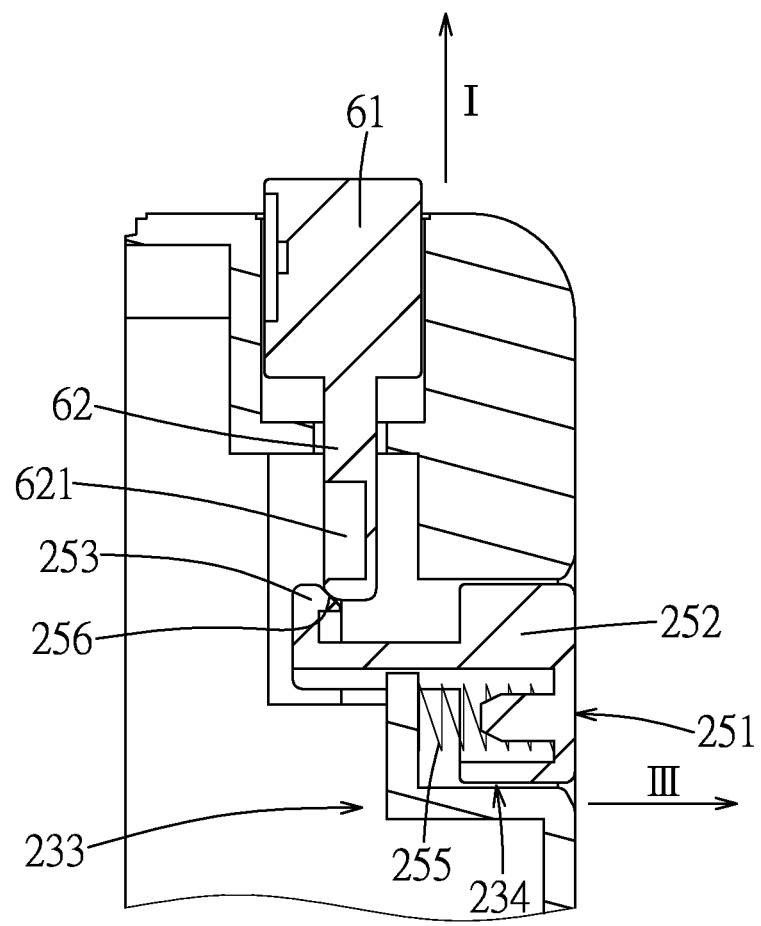
FIG. 20 is a view similar to FIG. 17, but illustrating the third electronic component being moved from the active position to the inactive position.

As shown in FIG. 20, to restore the third electronic component 6, the user pushes the third electronic component 6 downwardly, such that the distal end of the projecting plate 62 contacts the inclined surface 256 of the hook portion 253. When the user keeps pushing the third electronic component 6 downwardly, the locking button 251 is urged by the projecting plate 62 to move once again from the locked position to the unlocked position while the third spring 255 is compressed, thereby permitting of the third electronic component 6 to further move downwardly. When the distal end of the projecting plate 62 passes the hook portion 253, the locking button 251 is biased by the third spring 255 to move back to the locked position, and the hook portion 253 reengages the cavity 621 so as to position the third electronic component 6 at the inactive position.

Referring back to FIGS. 3 and 4, the top board 228, the back board 210 and the first and second lateral boards 213, 219 cooperatively define an accommodating space 237 thereamong. The display device 2 further includes a motherboard 26 accommodated in the accommodating space 237, a hard disk drive 27 connected electrically to the motherboard 26, and a plurality of cables 28 connecting electrically the motherboard 26 to the screen 20 and the first, second and third electronic components 4, 5, 6.

By virtue of the abovementioned configuration, when the first, second and third electronic components 4, 5, 6 are in their respective inactive positions, the POS system is compact and is easy to be transported. Therefore, the POS system of this invention is suitable for being used in temporary spots.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A point of sale system comprising:
    a base having a top surface;
    a display device including a casing that is formed with a first receiving groove, and a screen that is coupled to said casing and that is movable relative to said base between an unfolded position, wherein said top surface of said base and said screen cooperatively define an angle therebetween, and a folded position, wherein said top surface of said base contacts said screen;
    a pivoting mechanism interconnecting pivotally said display device and said base; and
    a first electronic component connected to said casing and movable between an inactive position, wherein said first electronic component is retracted within said first receiving groove, and an active position, wherein said first electronic component protrudes out of said first receiving groove;
    wherein said casing of said display device includes a back board, a first lateral board that is connected to said back board, and a first carrier that interconnects said back board and said first lateral board, said first carrier defining said first receiving groove and including two pivoting plates that are opposite to each other along a vertical axis, said first electronic component being pivotally connected to the pivoting plates;
    wherein said first electronic component includes a pivot that is connected pivotally to one of said pivoting plates;
    wherein said display device further includes a first locking mechanism including
        an engaging member that is connected to said casing and that is movable along the vertical axis between a locked position, wherein said engaging member engages said pivot so that said first electronic component is not permitted to move between the active and inactive positions, and an unlocked position, wherein said engaging member is disengaged from said pivot so that the movement of said first electronic component between the active and inactive positions is permitted, and
        a lock-and-release button that is connected to said engaging member, and that is movable to drive the movement of said engaging member between the locked position and the unlocked position;
    wherein said first locking mechanism further includes a first spring that biases said engaging member toward the locked position;
    wherein said pivot is formed with two engaging recesses;
    wherein said engaging member includes an engaging protrusion engaging removably one of said engaging recesses when said first electronic component is at the inactive position and said engaging member is at the locked position, and engaging removably the other one of said engaging recesses when said first electronic component is at the active position and said engaging member is at the locked position; and
    wherein each of said pivoting plates is formed with a through hole;
    wherein said first electronic component further includes an outer case having an end that is formed with a pivoting column which engages pivotally said through hole in one of said pivoting plates, and an opposite end that is opposite to said end along the vertical axis and that is formed with a non-circular hole; and
    wherein said pivot has a pivoting portion that engages pivotally said through hole in the other one of said pivoting plates, an insert portion that is connected to an end of said pivoting portion and that is inserted fittingly and co-rotatably into said non-circular hole of said outer case, and an engaging portion that is connected to an opposite end of said pivoting portion and that is formed with said engaging recesses, said engaging portion having an outer diameter that is greater than the outer diameter of said pivoting portion and a diameter of said through hole in the other one of said pivoting plates.

2. The point of sale systems as claimed in claim 1, wherein:
    said back board of said casing is formed with an accommodating groove; and
    said pivoting mechanism includes a support arm, two first hinges interconnecting said support arm and said base, and two second hinges interconnecting said support arm and said back board, said support arm being retracted in said accommodating groove when said display device is at the folded position.

3. A point of sale system comprising:
    a base having a top surface;
    a display device including a casing that is formed with a first receiving groove, and a screen that is coupled to said casing and that is movable relative to said base between an unfolded position, wherein said top surface of said base and said screen cooperatively define an angle therebetween, and a folded position, wherein said top surface of said base contacts said screen;
    a pivoting mechanism interconnecting pivotally said display device and said base; and
    a first electronic component connected to said casing and movable between an inactive position, wherein said first electronic component is retracted within said first receiving groove, and an active position, wherein said first electronic component protrudes out of said first receiving groove;
    wherein said casing of said display device includes a back board, a first lateral board that is connected to said back board, and a first carrier that interconnects said back board and said first lateral board, said first carrier defining said first receiving groove and including two pivoting plates that are opposite to each other along a vertical axis, said first electronic component being pivotally connected to the pivoting plates;

wherein said casing further includes a second lateral board that is connected to said back board and that is opposite to said first lateral board in a left-right axis, and a second carrier that interconnects said back board and said second lateral board, that defines a second receiving groove and that includes two connecting plates opposite to each other along the vertical axis;

wherein said point of sale system further comprises a second electronic component that is disposed in said second receiving groove, and that is movable along the left-right axis between an inactive position wherein said second electronic component is retracted within said second receiving groove, and an active position wherein said second electronic component protrudes out of said second receiving groove;

wherein said second electronic component has first and second positioning grooves spaced apart from each other along the left-right axis; and wherein one of said connecting plates includes a positioning hook that is proximate to said second lateral board, said positioning hook engages removably said first positioning groove when said second electronic component is at the inactive position, and engages removably said second positioning groove when said second electronic component is at the active position.

4. The point of sale system as claimed in claim 3, wherein:

one of said connecting plates has an elongated groove that extends along the left-right axis, and a shoulder portion that is formed at an end of said elongated groove; and said second electronic component further has a limiting member that extends into and is slidable along said elongated groove, and that abuts against said shoulder portion when said second electronic component is at the active position.

5. The point of sale system as claimed in claim 4, wherein:

said second electronic component further has a guiding groove extending along the left-right axis; and one of said connecting plate includes a guiding rail extending along the left-right axis for slidably engaging said guiding groove.

6. The point of sale systems as claimed in claim 3, wherein:

said casing is further formed with an accommodating groove; and said pivoting mechanism includes a support arm, two first hinges interconnecting said support arm and said base, and two second hinges interconnecting said support arm and said back board, said support arm being retracted in said accommodating groove when said display device is at the folded position.

7. A point of sale system comprising:

a base having a top surface;

a display device including a casing that is formed with a first receiving groove, and a screen that is coupled to said casing and that is movable relative to said base between an unfolded position, wherein said top surface of said base and said screen cooperatively define an angle therebetween, and a folded position, wherein said top surface of said base contacts said screen;

a pivoting mechanism interconnecting pivotally said display device and said base; and a first electronic component connected to said casing and movable between an inactive position, wherein said first electronic component is retracted within said first receiving groove, and an active position, wherein said first electronic component protrudes out of said first receiving groove;

wherein said casing of said display device includes a back board, a first lateral board that is connected to said back board, and a first carrier that interconnects said back board and said first lateral board, said first carrier defining said first receiving groove and including two pivoting plates that are opposite to each other along a vertical axis, said first electronic component being pivotally connected to the pivoting plates;

wherein said casing further includes a second lateral board that is connected to said back board and that is opposite to said first lateral board in a left-right axis, and a second carrier that interconnects said back board and said second lateral board, that defines a second receiving groove and that includes two connecting plates opposite to each other along the vertical axis;

wherein said point of sale system further comprises a second electronic component that is disposed in said second receiving groove, and that is movable along the left-right axis between an inactive position wherein said second electronic component is retracted within said second receiving groove, and an active position wherein said second electronic component protrudes out of said second receiving groove;

wherein said casing further includes a top board that interconnects said back board and said first and second lateral boards, and a third carrier that is connected to said top board and that defines a third receiving groove, said point of sale system further comprising a third electronic component disposed in said third receiving groove and slidable along the vertical axis between an inactive position wherein said third electronic component is retracted within said third receiving groove, and an active position wherein said third electronic component protrudes out of said third receiving groove;

wherein said third electronic component includes a projecting plate that projects through said third carrier;

wherein said casing is further formed with a fourth receiving groove below said third carrier; and wherein said point of sale system further comprising a second locking mechanism that includes a lock button movably disposed in said fourth receiving groove in a front-rear axis between a locked position, wherein said lock button engages said projecting plate, and a released position, wherein said lock button is disengaged from said projecting plate.

8. The point of sale system as claimed in claim 7, wherein said projecting plate has a cavity, said lock button having a hook portion that engages removably said cavity when said lock button is at the locked position.

9. The point of sale system as claimed in claim 8, wherein:

said second locking mechanism further includes a second spring for biasing said third electronic component upwardly toward the active position, and a third spring for biasing said lock button rearwardly toward the locked position.

10. The point of sale systems as claimed in claim 9, wherein:

said third carrier has a carrier board for supporting said third electronic component thereon, said carrier board being formed with a first hole for extension of said projecting plate therethrough, and a second hole spaced apart from said first hole;

said third electronic component further includes a stop hook that extends through said second hole and that abuts removably against said carrier board when said third electronic component is at the active position.

11. The point of sale systems as claimed in claim 7, wherein:
   said top board, said back board and said first and second lateral boards of said casing cooperatively define an accommodating space thereamong; and
   said display device further includes a motherboard accommodated in said accommodating space, and a plurality of cables connecting electrically said motherboard to said screen and said first, second and third electronic components.

12. The point of sale systems as claimed in claim 7, wherein:
   said casing is further formed with an accommodating groove; and
   said pivoting mechanism includes a support arm, two first hinges interconnecting said support arm and said base, and two second hinges interconnecting said support arm and said back board, said support arm being retracted in said accommodating groove when said display device is at the folded position.

\* \* \* \* \*